United States Patent [19]

Allen, Jr. et al.

[11] Patent Number: 5,779,592
[45] Date of Patent: Jul. 14, 1998

[54] FOUR POSITION SWITCH FOR SHIFT ASSIST SYSTEM

[75] Inventors: Charles E. Allen, Jr., Rochester Hills; Frank A. Palmeri, Troy, both of Mich.; Jon M. Huber, Laurinburg; Steven E. Radue, Southern Pines, both of N.C.

[73] Assignee: Meritor Heavy Vehicle Systems, LLC, Troy, Mich.

[21] Appl. No.: 508,153

[22] Filed: Jul. 27, 1995

[51] Int. Cl.⁶ ................................................. B60K 41/24
[52] U.S. Cl. ........................ 477/83; 477/109; 74/335
[58] Field of Search .......................... 74/335, 336 R; 477/83, 84, 107, 109, 111; 200/61.85, 61.88, 332.2

[56] References Cited

U.S. PATENT DOCUMENTS

| | | |
|---|---|---|
| 4,425,620 | 1/1984 | Batcheller et al. |
| 4,593,580 | 6/1986 | Schulze |
| 5,058,015 | 10/1991 | Leorat .................. 477/109 X |
| 5,172,603 | 12/1992 | MacInnis |
| 5,291,802 | 3/1994 | Kuriyama .................. 477/109 |
| 5,385,516 | 1/1995 | Grange et al. ............. 477/107 |
| 5,407,401 | 4/1995 | Bullmer et al. ........... 477/109 X |
| 5,408,895 | 4/1995 | Chan et al. ............... 74/336 R X |
| 5,429,559 | 7/1995 | Steeby .................... 477/80 |
| 5,436,419 | 7/1995 | Welscher et al. ........... 200/61.88 |
| 5,454,768 | 10/1995 | Jones et al. ............... 477/83 |
| 5,460,581 | 10/1995 | Ueda ..................... 477/109 X |
| 5,487,004 | 1/1996 | Amsallen ................. 74/336 R X |
| 5,506,771 | 4/1996 | Chan et al. ............... 74/335 X |

FOREIGN PATENT DOCUMENTS

| | | |
|---|---|---|
| A0629796 | 12/1994 | European Pat. Off. |
| 9102912 | 3/1991 | WIPO |
| WO9106903 | 5/1991 | WIPO |
| WOA9315927 | 8/1993 | WIPO |

*Primary Examiner*—Khoi Q. Ta
*Assistant Examiner*—Peter T. Kwon

[57] ABSTRACT

An operator input control system assists shifting between gears in a multi-speed transmission without clutching. A single switch allows an operator to provide an indication of the next gear that is to be selected, and further allows the operator the option of requesting torque elimination when moving the transmission to neutral. In one embodiment, the switch includes a rotatable switch body that is held in either an upshift or downshift intent position. The operator is able to move the switch a slight additional rotational amount beyond the intent position to request torque elimination. Once the operator releases the switch, it returns to the upshift or downshift indicated position. The inventive switch reduces the complexity of operator input in an overall system for assisting an operator in shifting transmission speeds without clutching.

10 Claims, 3 Drawing Sheets

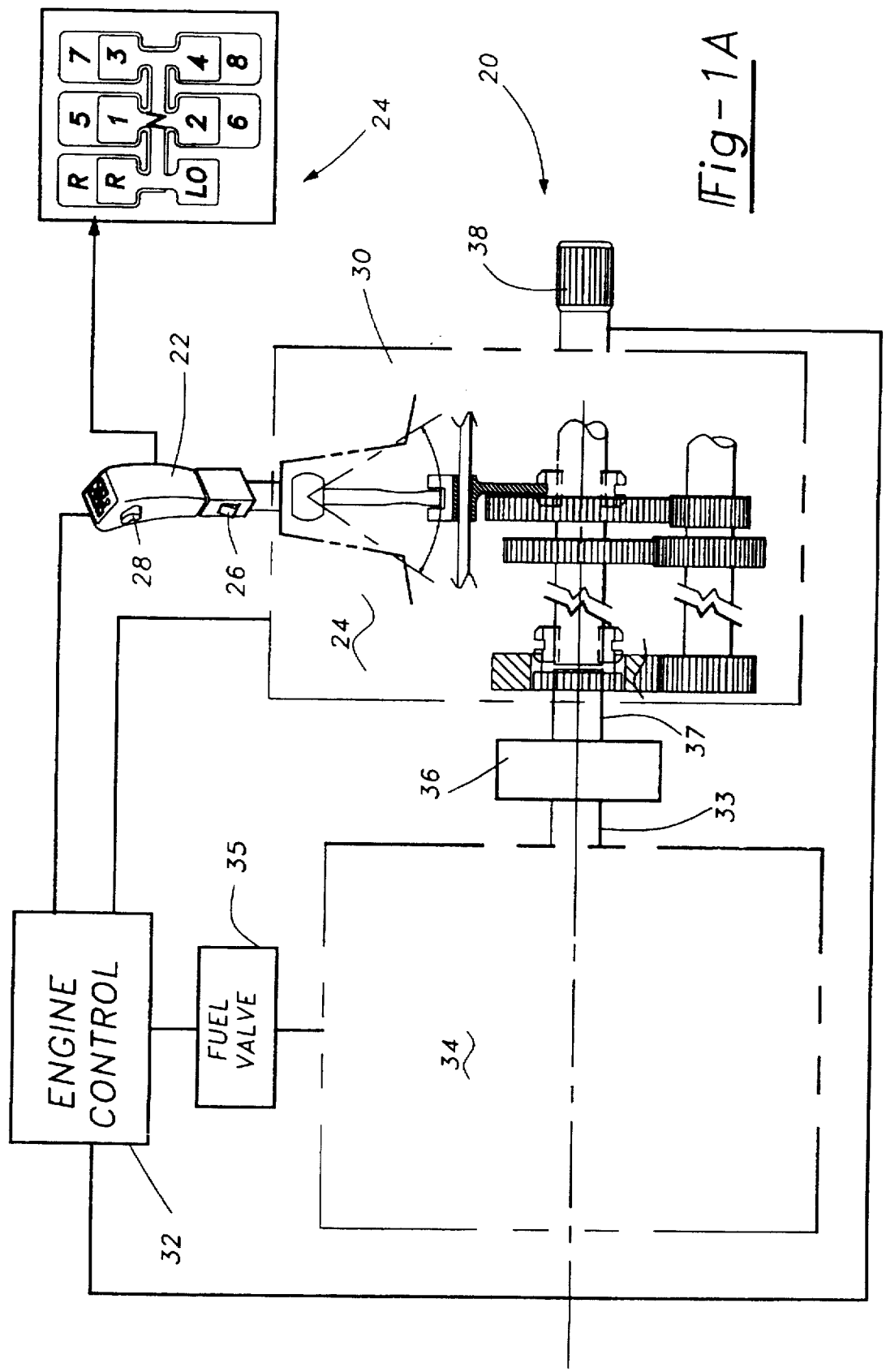

FOUR POSITION SWITCH FOR SHIFT ASSIST SYSTEM

BACKGROUND OF THE INVENTION

This invention relates to a single operator input switch for an engine speed control that allows an operator to selectively provide an intention of the next shift direction and request torque elimination to move the transmission to neutral.

Heavy vehicles equipped with manual transmissions typically are moved between several speeds at the control of a manual stick shift. An operator actuates a clutch to disengage torque transmission between the engine and the transmission and moves the transmission gears out of engagement. In moving the transmission to neutral, clutching is typically necessary since without clutching, there is "torque lock" on gears that transmit torque, holding them in position against axial movement. The clutch breaks torque lock, allowing the operator to easily move the gears out of engagement.

The operator then typically releases the clutch pedal, and attempts to adjust engine speed to a synchronization speed ratio that will be required at the next gear ratio to which the driver is moving the transmission. A good deal of experience and feel is required to even approximate this speed. The driver must reduce the engine speed when upshifting and the driver needs to increase the engine speed when downshifting. Once the driver achieves the desired speed, the clutch is again disengaged and the driver engages the new gear.

Even an experienced driver has difficulty exactly matching the synchronization speed ratio necessary at the next gear. Thus, the clutch is typically again actuated when reengaging the transmission to allow the transmission to compensate for the difference between the speed of the two transmission components that are being brought into engagement.

Recently, heavy vehicles such as trucks have become equipped with more controls that require operator-intensive operations. In addition, there are more inexperienced truck drivers on the road than there have been in the past. Thus, the complex operations associated with shifting a manual transmission including clutching, and "feel" that an operator must have to achieve the speed ratio synchronization, have become more burdensome.

It would be desirable to reduce the steps an operator of a vehicle must make on a routine basis while shifting gears. This is particularly true when several shifts are to be made in quick succession. It would be desirable to allow movement of the transmission to neutral for a shift without having to operate the clutch, to automatically synchronize the speed of the engine when the engine is in neutral, and then to allow re-engagement of the transmission without the clutch.

The prior art has proposed systems to assist in eliminating the torque load on the vehicle without clutching. Moreover, the prior art has proposed systems that attempt to synchronize the engine speed with the speed ratio that will be needed to shift smoothly to the next gear ratio. These systems have been overly complex. In general, the systems are more conceptual rather than systems which deal with the practical problems such a system would face in the field. As an example, a practical system must provide the operator the option of utilizing the clutch and shifting through normal operations on any particular shift. An operator might be more inclined to utilize assisted shifting without clutching when several sequential shifts are to be made in series. That same operator might otherwise wish to use the clutch in normal operation for less frequent shifting. The proposed prior art systems do not adequately deal with this real world reality. Moreover, the proposed prior art systems do not provide a practical operator control for the system.

SUMMARY OF THE INVENTION

In a disclosed embodiment of this invention a vehicle drive comprises an engine and an associated electronic control unit. The engine has an output shaft which drives a multi-speed transmission through a clutch. An output shaft of the transmission drives the drive axles for the vehicle. The electronic control unit is operable to control engine speed to reduce torque on the transmission upon request by the operator, and further to synchronize the engine speed to that desired at the next gear as a gear shift occurs. A single switch allows a driver to send control signals to the electronic control unit. The driver is able to move a switch body between at least two positions, one of which provides an intent to upshift, and the other of which provides an indication that the driver intends to downshift. The switch body remains in either the upshift intention or downshift intention positions until moved by the operator. In either the upshift or downshift positions, the operator is allowed to over-travel the switch a small additional amount to provide an additional signal to the electronic control unit that torque elimination is desired.

If the operator is making several sequential shifts, the switch may be left in the same position for all the shifts. As each shift is begun, the operator is able to request torque elimination to move the transmission to neutral. To request torque elimination, the operator merely moves the switch body a small additional amount beyond the upshift or downshift position. The operator is thus able to easily control the system and provide the required inputs to the electronic control unit.

In a most preferred embodiment of this invention, the above-described switch is provided in the stick shift. The stick shift is also preferably provided with an on/off switch that either turns the system on or off. When off, the operator is left with complete control of the vehicle. When on, the four-position switch described above is constantly providing an indication of whether an upshift or a downshift is the next desired shift. As the operator begins to shift, the operator insures that the switch is in the proper position to indicate an upshift or a downshift. The electronic control unit determines that the next gear would be the next higher or the next lower depending on the operator intention provided from the switch. The electronic control unit determines the next expected gear based upon the operator intent signal. The electronic control unit then calculated a desired synchronization speed for the next gear. An operator is able to request skip shifts by repeatedly requesting torque elimination.

A single switch providing the operator with the ability to send the signals simplifies driver operation. Separate switches might otherwise complicate the operation of the vehicle by the operator. Since the goal of the speed synchronization system is to reduce the complexity of vehicle operation, it would defeat that goal to provide a switch that is overly complex to use. As such, the inventive four-position switch disclosed and claimed in this invention provides valuable benefits.

These and other features of the present invention can be best understood from the following specification and drawings, the following of which is a brief description.

BRIEF DESCRIPTION OF THE DRAWINGS

FIG. 1A is a highly schematic view of a vehicle drive train incorporating the present inventive four-position switch.

DETAILED DESCRIPTION OF A PREFERRED EMBODIMENT

Figure 1B:
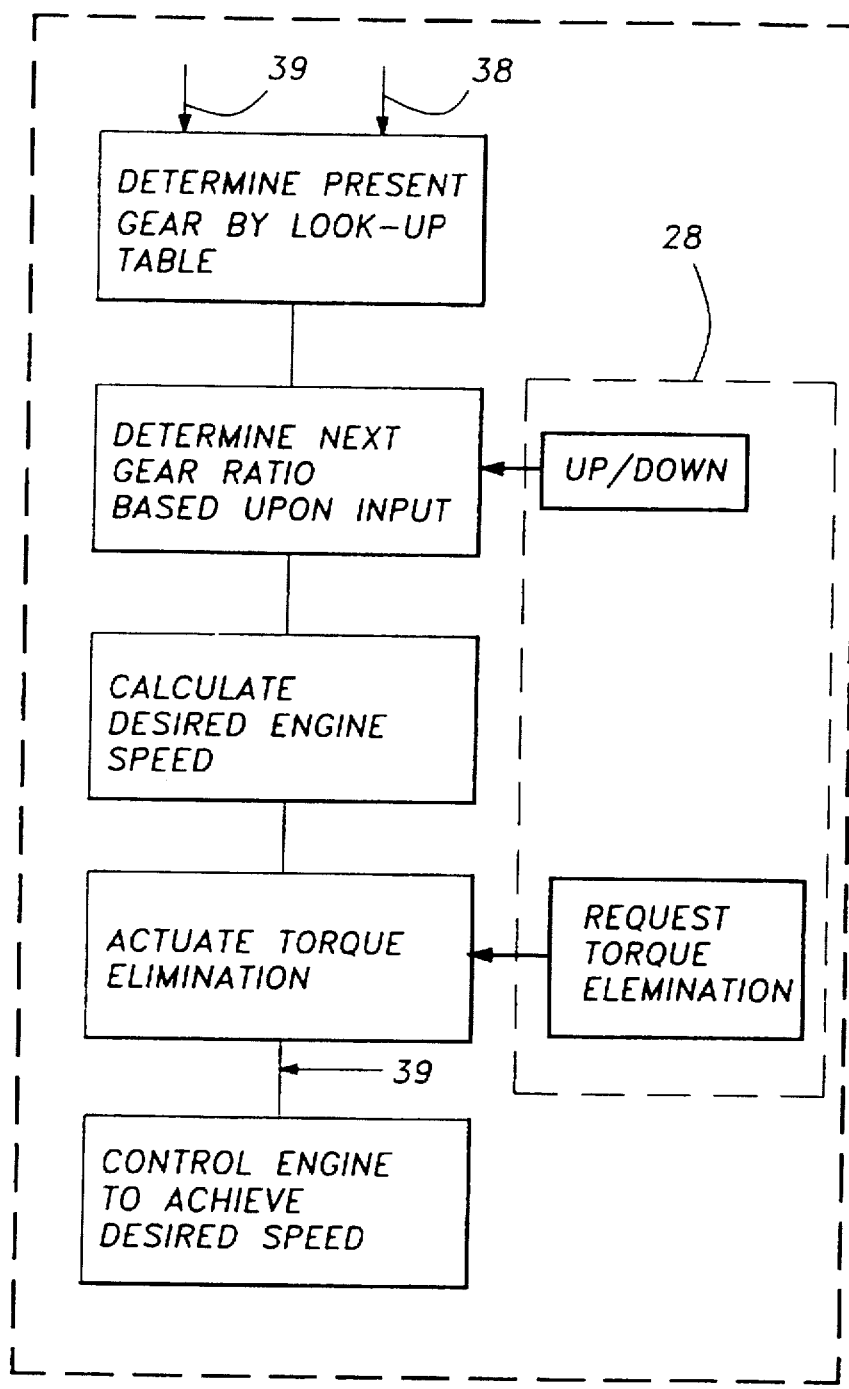
FIG. 1B is a highly schematic flow chart of an overall speed synchronization system incorporating the present inventive switch.

FIG. 1 shows a vehicle drive 20 incorporating a manual stick shift 22 having a diagram 24 of the proper position for the stick shift 22 to achieve certain gear ratios, as known. An on/off switch 26 allows the operator to actuate or deactivate an engine speed synchronization system for assisting the driver in shifting the transmission. A four-position switch 28, allows the operator to provide an indication of whether an upshift or a downshift is next expected. The switch 28 also allows an operator to request torque elimination when the transmission is being moved to neutral. Switches 26 and 28 are mounted in stick shift 22.

The stick shift 22 actuates gears within the transmission 30 as known. The stick shift 22 further sends communications from the switches 26 and 28 to an electronic control unit 32 for an engine 34. Electronic control unit 32 may be of a known type as commonly utilized to control the speed of engine 34 as by controlling the amount of fuel through fuel injectors 33. A known electronic control unit available under the trade name DDEC III, and available from Detroit Diesel Corporation may be modified to include additional control features relative to the speed synchronization and torque elimination features of this invention.

The engine 34 has an output shaft 35 connected to a selectively actuated clutch 36 to drive an input shaft 37 of transmission 30. An output shaft 38 of the transmission 30 transmits drive to the drive axles of the vehicle. The ratio of the speeds between input shaft 37 and output shaft 38 is changed dependent on the speed of the transmission 30 as controlled by the stick shift 22. As is known, when an operator wishes to move the transmission 30 to a new gear ratio, the stick shift 22 is utilized to move sliding members within transmission 30 to effect this gear change. A signal of whether the transmission is in neutral or engaged is also sent to ECU 32. In the prior art, the operator initially actuated the clutch 36 to break torque transmission between shafts 35 and 37. The operator is then able to easily move the transmission 30 to neutral. Once in neutral, the operator controlled the speed of the engine 34 to attempt to synchronize the speed with that which the operator estimates would be necessary for achieving the necessary ratio, once transmission 30 is moved to the new gear ratio. This synchronization was largely dependent on the experience and skill of the driver, and required a good deal of "feel." Once the driver estimated that the engine was approximately the right speed, the driver reengages the transmission, again by actuating the clutch. Although the driver could actuate the clutch a single time to effect this shift, typically the driver would actuate the clutch twice, as some period of time was typically required to effect the engine change to the synchronized speed.

A system for achieving movement to neutral and speed synchronization without the driver having to actuate the clutch, or attempt to synchronize the speed manually is shown in FIG. 1B. The ECU 32 calculates the currently engaged gear ratio based on the speed of shaft 35 and the speed of shaft 38. The ECU then determines what the next gear ratio would be based upon the shift intent signal received from the operator and the currently engaged gear.

The ECU then determines the desired engine speed at the next gear ratio by multiplying the output speed on shaft 38 by the gear ratio at the next desired gear. The ECU is attempting to match the speed ratio. This results in a desired input engine speed to achieve a synchronized shift. In practice the determination might not be made until after the transmission is in neutral. Moreover, the determination is repeated periodically as transmission speed changes. However, the signal is typically received before movement to neutral as shown in the flowchart.

When the driver begins to move the transmission to neutral, the driver may request torque elimination through switch 28. If so, the ECU calculates a predicted zero torque parameter for the engine, such as fueling and begins to move the engine fueling to that predicted value. This system is disclosed in more detail in U.S. patent application Ser. No. 08/508,155, entitled "Method and Apparatus for Assisting and Shifting Transmission to Neutral," filed on the same day as this application. When ECU 32 achieves the desired zero torque engine fueling, the operator is then able to move the transmission to neutral.

A neutral signal is then sent to ECU 32. At that time, ECU 32 controls the engine speed to achieve the synchronized speed. The operator continues to move the gear into engagement, and once the gear is fully engaged a signal is sent to ECU 32 that the shift is complete. At that time, control of the system is returned to the operator.

The above is intended as a simplified description of a complicated system. Details of the systems are disclosed in several co-pending patent applications. A preferred switch to provide the neutral and gear engaged signals is disclosed in co-pending U.S. patent application Ser. No. 08/508,067, entitled "Two-Position Neutral Switch for Multi-Speed Transmission." During an upshift, it may be desirable to add an additional decay to the engine speed to quickly reduce the engine speed. Such a system is disclosed in co-pending U.S. patent application Ser. No. 08/508,111, which is entitled "Engine Speed Retardation On a Transmission Upshift." The engine speed synchronization system is disclosed more fully in co-pending U.S. patent application Ser. No. 08/508,135, which is entitled "Engine Speed Synchronization System for Assisting a Manual Transmission Shift." Other features of the system are generally disclosed in co-pending U.S. patent applications Ser. No. 08/507,996, entitled "Automatic Range Shift for Multi-Speed Transmission;" and U.S. patent application Ser. No. 08/508,156, entitled "Combined System for Assisting Shifting of Manual Transmission Without Clutching. Finally, the general switching parameters of allowing selective shift intent and torque elimination are disclosed in co-pending U.S. patent application Ser. No. 08/508,307, entitled "Operator Input System for Gear Shift Assist Mechanism." The present invention is directed to an improvement of the switch system in that application which reduces the complexity of the input operation for the operator. All of the above applications are filed on the same day as this application.

Figure 2A:
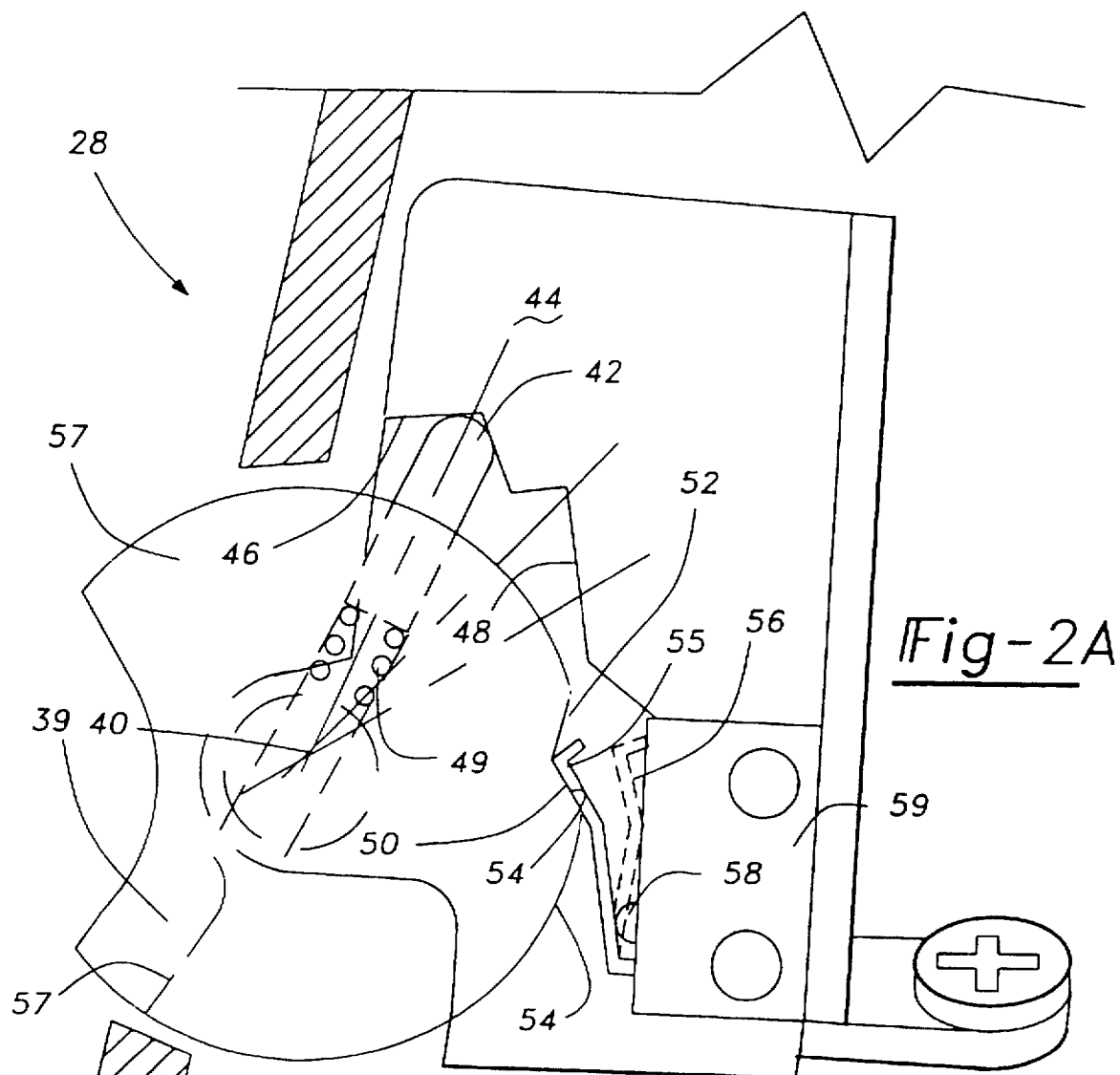
FIG. 2A is a cross-sectional view through a switch according to the present invention.
Figure 2B:
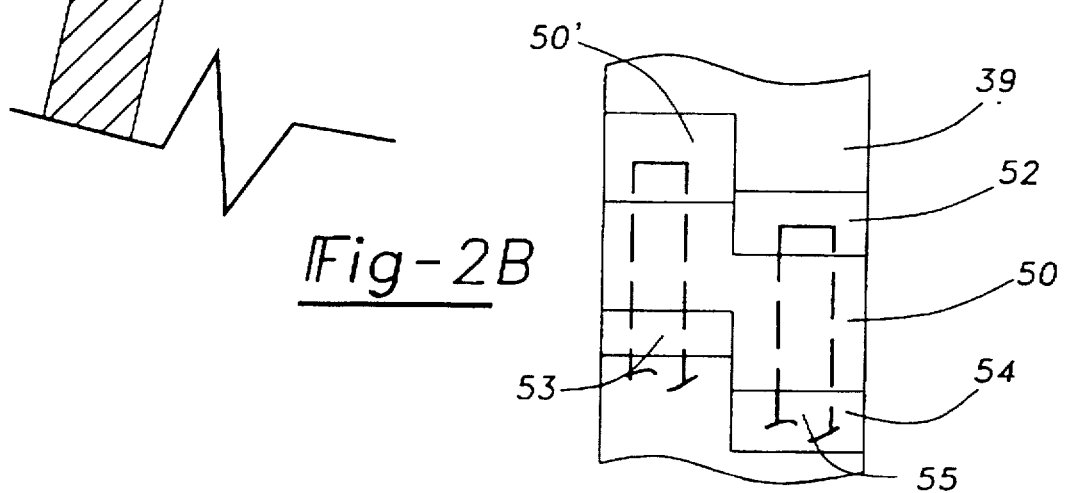
FIG. 2B shows a portion of the switch of FIG. 2A.

The details of switch 28 are illustrated in FIGS. 2A and 2B. As shown, a switch body 39 rotates about an axis 40. A plunger 42 is received within body 39, and rides along surfaces of a contact body 44. Two holding portions 46 and 48 are defined for the plunger 42, which holds the switch body at one of two positions. The plunger 42 is held in one of the two positions 46 and 48. A switching recess 50 is formed in body 39 and includes two opposed ramped surfaces 52 and 54. These two surfaces allow the momentary movement to the torque elimination request position.

A contact 55 contacts the switch body 39, and rides along surfaces 52 and 54. A second contact 53 rides in a cam surface 50' and provides a signal in one of the two positions identified by holding portions 46 or 48. An electrical circuit is completed, providing a signal to ECU 32. In the other position, there is an open circuit and no signal is sent. The signal from contact 53 is read as an indication that an upshift or a downshift is next expected. In the absence of such a signal the ECU will determine that the other shift direction is being indicated. With the switch in either the upshift or downshift position, the contact 55 is in the position shown in solid line. Should the operator desire to request torque elimination, the switch is rotated a further distance to the position shown in phantom at 57. In this position, the contact 55 is forced downwardly to the position shown at 56 and ball 58 is forced downwardly completing a contact within a switch box 59. A similar switch, not shown, is actuated by contact 53 to complete that circuit. In one of the two positions contact 53 actuates its switch. The plunger 42 is forced farther inwardly during this movement, compressing spring 49. This contact provides a separate signal that torque elimination is being requested. The ramp surfaces 52 and 54 guide the contact 55 downwardly as long as an operator holds the switch body 39 at position 57. Once t he operator releases the switch body 39, the spring force of the contact 55 and spring will return the switch body 39 to the non-torque elimination requested position. The switch body 39 remains in either the upshift intent or downshift intent positions until moved. Stops are also provided between body 39 and body 44 to prevent overtravel in the torque elimination request position.

When an operator wishes to utilize the speed synchronization system, initially the on/off switch 26 is switched to on. The operator next selects whether upshifting or downshifting will next occur, and moves the switch 28 to the proper position. When the driver wishes to begin actuating a shift, the driver may request torque elimination. The switch body is moved beyond the intent position to the torque elimination request position. The operator may do this merely by forcing the switch beyond its intent position. The operator is able to easily actuate this control with a simple finger pressure on the switch 28 as the operator holds the shift knob 22 to begin shifting transmission 30. No complex searching for separate switches is required, nor is any complex switch actuation required. Rather, a mere additional force on the switch body 39 is all that is required. The ECU 32 then achieves torque reduction. The operator is then able to move the transmission out of engagement to neutral with stick shift 22.

ECU 32 then synchronizes the engine speed as described above. Once the engine speed is synchronized, the driver is able to reengage the transmission 30, and begin driving at the new gear. Once the electronic control unit 32 receives the signal that the gear is reengaged, control passes from the electronic control unit back to the operator. A driver may indicate skip shifting by repeatedly actuating and release the torque elimination request. ECU "counts" the actuations and adds the number of actuations to the current gear to determine the next gear.

A preferred embodiment of this invention has been disclosed, however, a worker of ordinary skill in the art would recognize that certain modifications would come within the scope of this invention. For that reason the following claims should be studied to determine the true scope and content of this invention.

We claim:

1. A vehicle drive control system comprising:
    an engine having an output shaft, and an electronic control unit for controlling the output speed of said engine output shaft;
    a multi-speed transmission connected to be driven by said engine output shaft for outputting the engine output speed through several speed ratios;
    a manual stick shift for shifting said transmission between said several speed ratios;
    a clutch selectively actuated by an operator and positioned between said engine and said transmission; and
    a single operator input control switch allowing an operator to provide an indication to said electronic control unit of one of an upshift and a downshift to be initiated, and further providing the operator the ability to request torque elimination as the driver begins to move the transmission to neutral, said electronic control unit being operable to receive signals from said input control and determine a desired engine speed at a next gear based upon said indication from the operator, and control said engine to achieve said desired engine speed, said electronic control unit further being operable to reduce torque to allow the operator to move said transmission to a neutral position when said torque elimination request signal is received by said electronic control unit, said input control switch being configured such that it is held in respective ones of at least two positions to indicate upshift intent and downshift intent, and said switch body remaining in said position until moved by an operator, said torque elimination request being initiated by movement of said switch body from said one of said upshift and downshift intent positions to torque elimination request positions, and said switch body returning to said one of said upshift and downshift positions from said torque elimination request position once an operator has released said switch body.

2. A control as recited in claim 1, wherein said switch body rotates about an axis between two positions indicating upshift intent and downshift intent, and said switch body being rotatable beyond either of said positions to said torque elimination request position when a force is applied to the switch body by an operator.

3. A control system as recited in claim 2, wherein a contact member provides an electric signal to said electronic control unit when said switch body is in one of said upshift intent or downshift intent positions, and a second circuit being actuated to provide said torque elimination request when said switch body is moved beyond either said upshift intent and said downshift intent positions.

4. A control system as recited in claim 3, wherein said operator is further provided with a second switch that allows deactivation of said speed synchronization function of said electronic control unit to allow an operator to manually shift said transmission by utilizing said clutch.

5. A control system as recited in claim 4, wherein said second switch and said operator input control switch are both received in said manual stick shift.

6. A control system as recited in claim 1, wherein said operator input control switch is received in said manual stick shift.

7. A method of operating a vehicle comprising the steps of:
    a) providing a vehicle drive including an engine having an output shaft, an electronic control unit for controlling the speed of said engine output shaft, a multi-speed transmission selectively driven by said engine output shaft, said multi-speed transmission being operable to be moved between selected speed ratios to control the ratio between an output speed of said transmission and the speed of said engine output shaft, a clutch disposed between said engine output shaft and said transmission to allow breaking of the rotational drive transmitted from said engine to said transmission, a manual stick shift for shifting said transmission between said speed ratios, and a single operator input switch allowing an operator to provide an indication to said electronic control unit of when one of an upshift and a downshift is to be expected as the next shift, and further providing the operator the ability to request torque elimination from the electronic control unit such that said transmission is moved to neutral without actuating said clutch, said electronic unit being operable to receive said indication of said one of an upshift and a downshift, and to determine a desired engine speed at a next gear based upon said indication, and the currently engaged gear;

b) operating a vehicle;

c) providing an indication through said operator input switch of which one of an upshift and a downshift is expected as the next gear shift by positioning said operator input switch in one of an upshift and a downshift position;

d) providing an indication that torque elimination is desired from said switch by moving said switch from said one of said upshift and downshift positions;

e) reducing the torque load from said engine on said transmission upon receiving a request for torque elimination;

f) releasing said switch from said torque elimination request position and allowing said switch to return to said shift intent position;

g) moving said transmission to a neutral position by movement of said stick shift;

h) providing a signal to said electronic control unit that said transmission is in neutral;

i) identifying a desired engine speed value at the next gear based upon said driver indication of said one of an upshift and a downshift is next expected;

j) using said electronic control unit to begin moving said engine speed to said desired engine speed; and k) engaging said transmission in the next selected gear by moving said stick shift to engage said gear.

8. A method as recited in claim 7, wherein said switch rotates between said upshift intent and said downshift intent positions, and said switch being rotated beyond said upshift intent or said downshift intent position to the torque elimination request position, said switch being biased back to said upshift intent and said downshift intent positions from said torque elimination request position such that upon release by an operator, said switch returns to said upshift intent position or said downshift intent position from said torque elimination request position.

9. A method as recited in claim 7, wherein the method includes the further steps of providing an on/off switch, allowing selective enablement and disablement of the speed control for assisting shifting.

10. A method as recited in claim 9, wherein said single operator input switch and said on/off switch are both provided in said manual stick shift.

* * * * *